Jan. 6, 1970   R. C. KUHNS   3,487,489

TREAD PLATE

Original Filed Jan. 31, 1968

Inventor
Robert C. Kuhns
By Andrus, Sceales, Starke & Sawall
Attorneys

United States Patent Office 3,487,489
Patented Jan. 6, 1970

3,487,489
TREAD PLATE
Robert C. Kuhns, Elm Grove, Wis., assignor to Kelley Company, Inc., Milwaukee, Wis., a corporation of Wisconsin
Original application Jan. 31, 1968, Ser. No. 701,981, now Patent No. 3,423,559. Divided and this application Aug. 30, 1968, Ser. No. 756,454
Int. Cl. E01d *15/12;* E01c *11/24;* B23k *9/04*
U.S. Cl. 14—72                                        3 Claims

ABSTRACT OF THE DISCLOSURE

The invention relates to a tread plate having improved anti-slip properties achieved by depositing a series of weld beads on a surface of the tread plate using a bare-unshielded, welding wire or electrode and a high current density. The resulting weld bead is rough and irregular and contains numerous pits, craters, oxide inclusions and other irregularities which increase the frictional qualities of the tread plate.

---

This application is a division of application Ser. No. 701,981, filed Jan. 31, 1968 and entitled Tread Plate, now Patent No. 3,423,559.

Metal tread plates, used for walkways, ramps, decks, stair treads and the like, are normally provided with a textured or abrasive surface to increase the anti-slip properties of the tread plate. One common form of metal tread plate has a textured or embossed pattern rolled into the metal. This type of tread plate is relatively expensive and while the textured pattern provides an improvement in traction over a smooth metal plate, under wet or icy conditions, traction is often inadequate.

In another form of conventional tread plate, particles or grit of an abrasive material, such as aluminum oxide, are bonded to the surface of the plate with resin, or the grit is rolled into the plate surface. While a tread plate of this type has excellent anti-slip properties, it is extremely expensive to fabricate, and due to the aluminum oxide coating is very difficult to cut to size and fabricate.

In some installations grating and expanded metal tread plate are employed. This variety of tread plate is quite expensive and provides problems in fabrication as it is difficult to weld components to the grating or expanded metal and to cut the material to size.

The present invention is directed to an inexpensive metal tread plate which can be readily fabricated and has exceptional anti-slip characteristics. According to the invention, the surface of the tread plate which is to be subjected to pedestrian or vehicular traffic is provided with a series of spaced weld beads. Instead of the weld beads being smooth and regular as in normal welding practice, the weld beads are rough and irregular and contain numerous pits, craters, oxide inclusions, as well as weld spatter. The irregular weld bead is produced by using a bare carbon steel electrode or weld wire with a high current density and a stubbing arc.

The rough weld bead provides exceptional anti-slip properties, and as the weld bead is worn, additional inclusions and pits are exposed to thereby maintain the rough and irregular character of the weld bead throughout its entire length of service. Moreover, the tread plate can be fabricated with standard welding equipment, ether manually or in an automated process in which the plate is moved relative to a series of welding heads, or the welding heads are moved relative to the plate.

As a further advantage, the tread plate can be readily cut to size and fabricated into the desired article such as a ramp, deck plate, stair tread and the like, which conventional fabricating equipment and techniques.

Other objects and advantages will appear in the course of the following description.

The drawings illustrate the best mode presently contemplated of carrying out the invention.

The drawings illustrate the tread plate of the invention used as a dockboard ramp 1 which bridges the gap between a dock 2 and the bed of a carrier or truck 3. The dockboard is a conventional type, such as that described in United States Patent 3,117,332 and is located within a pit or recess in the dock surface so that in the stored position the upper surface of the ramp 1 is generally flush with the dock 2. After the carrier has backed toward the dock, the operator manually releases the locking mechanism, causing the ramp to be pivoted upwardly by a counterbalancing system, and causing the lip 4 of the ramp to pivot upwardly so that it is substantially flush with the ramp surface. The operator then walks the ramp down onto the bed of the truck 3 in a conventional manner.

Figure 2:
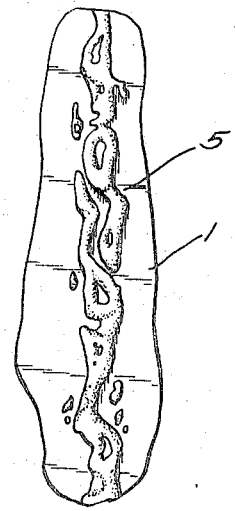
FIG. 2 is an enlarged perspective view of the weld bead.

According to the invention, the ramp 1 includes a series of generally parallel weld beads 5 which extend in a fore and aft direction of the ramp. As shown in FIG. 2, each weld bead is irregular and rough and includes numerous pits, craters, bubbles, oxide inclusions and spatter. It is desired that the weld bead have a rough texture, and this is directly opposed to traditional welding theories which demand a smooth, regular weld bead free of pits, inclusions and other defects. The defects in the weld bead 5 provide sharp abrasive points of contact, thereby providing excellent anti-slip properties. Moreover, as the weld bead wears away during service, additional pits, inclusions and the like are exposed to thereby maintain the abrasive points of contact throughout the entire length of service of the ramp.

Figure 1:
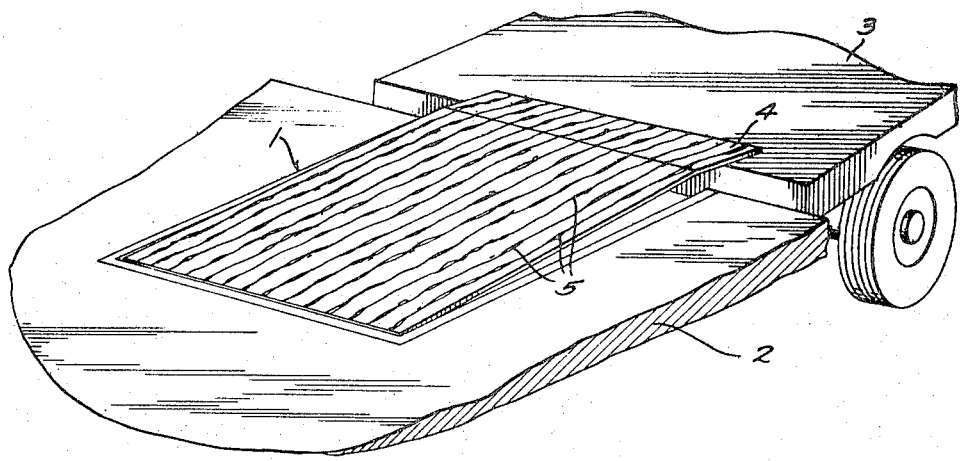
FIG. 1 is a perspective view of a tread plate of the invention utilized as a dockboard ramp.

If the tread plate is employed as a dockboard ramp, as shown in FIG. 1, the weld beads 5 are preferably arranged in parallel fore to aft relation, with each weld bead being spaced approximately 1 to 2 or more inches apart, so that more than one weld bead will be in contact with the tires of a lift truck or other vehicle which may be moving across the ramp.

The weld bead 5 can either be continuous or interrupted. For some applications, a cross-hatch, diagonal or haphazard type of weld bead pattern can be employed, depending upon the particular use and type of traffic to which the tread plate is exposed.

The weld beads 5 are produced by a technique directly opposed to normal welding practice. It is normally desired to produce a smooth, regular weld bead free of inclusions and other irregularities. In order to provide a sound, smooth weld bead, conventional practice generally requires that the arc be shielded by an inert or reducing gas and that flux materials, either in the form of an external coating or as an internal core, be used with the weld wire or electrode. In addition, in some cases deoxidizing metals are alloyed with the electrode and the deoxidizing metals act to convert any oxygen present in the vicinity of the arc to stable oxides. In contrast to normal welding practice, the present invention contemplates the use of a bare, unshielded carbon steel weld wire or electrode. No shielding gas, nor flux ingredients are associated with the electrode and substantially no alloying additions are present in the electrode.

In carrying out the welding process, a high current density is employed, generally above 140,000 amperes per square inch, and preferably in the range of 160,000 to 170,000 amperes per square inch when using a carbon steel electrode. In addition, an extremely short stubbing arc is used, having a minimum length of approximately 0.005 inch or less. For most applications, reverse polarity is employed. However, in some instances, positive polarity can be used, but the penetration will not be as great when using negative polarity. However, positive polarity results in less heat being generated in the tread plate, so if warpage is a serious problem, positive polarity can be employed.

Under these welding conditions using a bare, unshielded, carbon steel electrode in combination with a high current density and a stubbing arc, an explosive rather than a stable arc is produced. This results in the weld metal being deposited in an irregular pattern, forming numerous pits, craters, protruberances, oxide inclusions and other inconsistencies, as best shown in FIG. 2.

Figure 3:
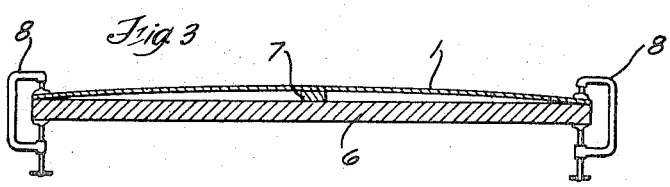
FIG. 3 is a schematic representation of the fixture employed to clamp the plate during the welding process.

As some warpage of the tread plate may occur during the welding operation due to the heat generated, it is preferred to pre-camber the plate during the welding. As shown in FIG. 3, the central portion of the plate 1 is spaced from a base 6 of the fixture by a shim 7 and the edges of the plate are clamped to the base so that the plate has a generally curved or cambered contour. The weld bead is then deposited in a direction from one of the clamps 8 to the other clamp. After welding, when the plate is released from the clamps, it will be relatively straight, and no straightening operation is normally necessary.

A specific example of the welding process used to fabricate the tread plate is as follows:

| | |
|---|---|
| Plate composition | ASTM A441 steel. |
| Plate size | 72″ x 83″ x 3/16″. |
| Electrode size | 1/16 inch diameter. |
| Electrode composition: | |
| Carbon | .13–.19%. |
| Manganese | .95–1.30%. |
| Phosphorus | .025% max. |
| Sulphur | .035% max. |
| Silicon | .45–.60% |
| Iron | Balance. |
| Speed of electrode feed | 800 inches/minute. |
| Speed of travel of electrode | 110 inches/minute. |
| Arc amperage | 500 amperes. |
| Arc voltage | 35 volts. |
| Current density | 160,000 amperes/sq. in. |
| Polarity | Reverse. |

Under these welding conditions using a bare, unshielded carbon steel electrode in air, an unstable explosive arc was produced which resulted in an irregular rough deposition of weld metal containing craters, inclusions, voids and other irregularities not normally found in a sound weld.

The tread plate of the invention can be used in any application which is subjected to pedestrian or vehicular traffic and requires an anti-slip or frictional surface. In addition to the tread plate being used as a ramp for a dockboard, the tread plate can also be used as a walkway, bridge surface, catwalk, ship decking, stair treads or any other application where slippery conditions are encountered due to the presence of materials such as oil, printers' ink, or the like.

While the above description has been directed to the formation of a carbon steel weld bead on a low alloy steel tread plate, it is contemplated that the tread plate and weld bead can be formed of any desired metals or alloys such as aluminum, magnesium, stainless steel, bronze or the like, but regardless of the materials used, it is important that the weld be produced by techniques generally opposite to that of commonly accepted welding practices so that an irregular rough weld bead results.

Various modes of carrying out the invention are contemplated as being within the scope of the following claims particularly pointing out and distinctly claiming the subject matter which is regarded as the invention.

I claim:

1. A tread plate, comprising a metal plate having a surface exposed to traffic, and a series of weld beads disposed on said surface in generally exploded form, said weld beads as deposited being rough and irregular and containing numerous pits, craters, inclusions and other welding inconsistencies therethrough, said rough and irregular weld beads providing improved, anti-slip characteristics for said plate so that as said weld beads wear away in service, internal pits and inclusions are exposed to maintain the rough characteristics of the weld bead throughout the life of service.

2. The tread plate of claim 1, wherein said weld beads are generally parallel to each other and spaced apart.

3. In a dockboard, a ramp adapted to span the gap between a dock and the bead of a carrier, and a series of weld beads deposited on the upper surface of the ramp and extending generally in a direction from the dock to the carrier, said weld beads being rough and irregular and containing numerous pits, craters, inclusions and other welding irregularities, said weld beads providing improved anti-slip characteristics for the ramp.

References Cited

UNITED STATES PATENTS

| | | | |
|---|---|---|---|
| 1,657,446 | 1/1928 | Nagin | 94—5 |
| 2,056,677 | 10/1936 | Koll | 94—5 |
| 2,190,211 | 2/1940 | Lavellee | 94—5 |

JACOB L. NACKENOFF, Primary Examiner

U.S. Cl. X.R.

94—5; 219—76